United States Patent
Qi et al.

(10) Patent No.: US 10,646,852 B2
(45) Date of Patent: May 12, 2020

(54) DOUBLE-LAYER ZNO HOLLOW SPHERE PHOTOCATALYTIC MATERIAL AND PREPARATION METHOD THEREOF

(71) Applicant: CHANGZHOU VOCATIONAL INSTITUTE OF ENGINEERING, Changzhou, Jiangsu (CN)

(72) Inventors: Xiuxiu Qi, Jiangsu (CN); Wenhua Chen, Jiangsu (CN); Qiaoyun Liu, Jiangsu (CN); Wenwen Zhang, Jiangsu (CN)

(73) Assignee: CHANGZHOU VOCATIONAL INSTITUTE OF ENGINEERING, Changzhou, Jiangsu (CN)

( * ) Notice: Subject to any disclaimer, the term of this patent is extended or adjusted under 35 U.S.C. 154(b) by 60 days.

(21) Appl. No.: 16/083,754

(22) PCT Filed: Jun. 30, 2016

(86) PCT No.: PCT/CN2016/087811
§ 371 (c)(1),
(2) Date: Sep. 10, 2018

(87) PCT Pub. No.: WO2017/219382
PCT Pub. Date: Dec. 28, 2017

(65) Prior Publication Data
US 2019/0076823 A1    Mar. 14, 2019

(30) Foreign Application Priority Data

Jun. 21, 2016    (CN) .......................... 2016 1 0454961

(51) Int. Cl.
*B01J 23/06*    (2006.01)
*B01J 35/08*    (2006.01)
(Continued)

(52) U.S. Cl.
CPC ............. *B01J 23/06* (2013.01); *B01J 35/002* (2013.01); *B01J 35/004* (2013.01); *B01J 35/023* (2013.01);
(Continued)

(58) Field of Classification Search
CPC ........ B01J 23/06; B01J 35/002; B01J 35/004; B01J 35/023; B01J 35/08; B01J 37/0018; B01J 37/033; B01J 37/08
See application file for complete search history.

(56) References Cited

FOREIGN PATENT DOCUMENTS

| CN | 102464304 A | 5/2012 |
| CN | 102543456 A | 7/2012 |

(Continued)

OTHER PUBLICATIONS

Yiamsawas et al (Preparation of ZnO Nanostructures by Solvothermal Method, J Micro Soc Thai (2009), 23(1): 75-78) (Year: 2009).*
(Continued)

*Primary Examiner* — Melvin C. Mayes
*Assistant Examiner* — Michael Forrest
(74) *Attorney, Agent, or Firm* — Novick, Kim & Lee, PLLC; Allen Xue

(57) ABSTRACT

The present invention belongs to the technical field of photocatalytic materials and preparation thereof, and more particularly, relates to a double-layer ZnO hollow sphere photocatalytic material. The double-layer ZnO hollow sphere photocatalytic material is formed by inner and outer layers of ZnO hollow spheres; the hollow spheres on the inner layer have a diameter of 1.0-2.5 μm; and the hollow spheres on the outer layer have a diameter of 1.5-4.5 μm. The present invention further relates to a preparation method of the double-layer ZnO hollow sphere photocatalytic material, which comprises the following steps of: dissolving dissolvable zinc salt into a mixture of monohydric alcohol
(Continued)

and ethylene glycol to prepare a solution, and then performing a solvothermal reaction on the solution under airtight conditions to prepare the double-layer ZnO hollow sphere photocatalytic material.

4 Claims, 3 Drawing Sheets

(51) Int. Cl.
  *B01J 35/02* (2006.01)
  *B01J 37/03* (2006.01)
  *B01J 37/00* (2006.01)
  *B01J 35/00* (2006.01)
  *B01J 37/08* (2006.01)
(52) U.S. Cl.
  CPC ........... *B01J 35/08* (2013.01); *B01J 37/0018* (2013.01); *B01J 37/033* (2013.01); *B01J 37/08* (2013.01)

(56) References Cited

FOREIGN PATENT DOCUMENTS

| CN | 103418317 A | * | 12/2013 | ............... B01J 13/02 |
| CN | 102543456 B | * | 4/2014 | ............ Y02E 10/549 |
| KR | 1020120075874 A | | 7/2012 | |

OTHER PUBLICATIONS

Wang, Xi et al. "ZnO Hollow Spheres with Double-Yolk Egg Structure for High-Performance Photocatalysts and Photodetectors" Advanced Materials, vol. 24, Jun. 5, 2012 (Jun. 5, 2012), ISSN: 1521-4095, pp. 3421-3425.

Bao, Yan et al. "Progress in Preparation and Application of ZnO Hollow Microspheres" Materials Review, vol. 29, No. 6, Jun. 30, 2015 (Jun. 30, 2015), ISSN: 1005-023X, pp. 1-8.

* cited by examiner

DOUBLE-LAYER ZNO HOLLOW SPHERE PHOTOCATALYTIC MATERIAL AND PREPARATION METHOD THEREOF

TECHNICAL FIELD

The present invention belongs to the technical field of photocatalytic materials and preparation thereof, and more particularly, relates to a double-layer ZnO hollow sphere photocatalytic material and a preparation method thereof.

BACKGROUND ART

In the 21st century, the source of energy and the environmental issue are two major challenges posed to the sustainable development of human beings. As solar energy has such features as inexpensiveness, cleanliness and regeneration, researchers from different countries are endeavoring to achieve its efficient and rapid utilization, conversion and storage. The semiconductor photocatalysis technique, which exhibits such features as high processing efficiency and absence of secondary pollution, can effectively degrade toxic and harmful pollutants, and thus has a wide prospect of being applied to solve environmental issues.

Zinc oxide (ZnO) is a semiconductor material having a band gap of 3.2 eV. Under irradiation of ultraviolet light, ZnO may be excited to produce photo-generated electron-hole pairs, and is thereby further subjected to oxidation-reduction reaction. As compared with the common $TiO_2$ photocatalyst, ZnO has a higher electron transporting rate and a longer photon-generated carrier lifetime, such that it has a wide application prospect in such fields as photocatalytic degradation of organic pollutants and solar batteries. Furthermore, studies show that porous and hollow structures play an important role in improving the activity of photocatalytic materials. On one hand, these structures may offer more active sites; on the other hand, hollow structures also contribute to the repeated refraction and scattering of light, thereby improving the utilization rate of light.

In order to prepare hollow-structured ZnO particles, such templating agents as carbon spheres and silicon spheres are generally added during their preparation so as to obtain a hollow structure; thereafter, high-temperature calcination is conducted to remove these templates, thereby obtaining the hollow structure. However, the above method is relatively cumbersome, and ZnO hollow spheres can't be directly synthesized in one step. Moreover, high-temperature roasting may also result in cracking of hollow structures and agglomeration of particles.

No report has ever been made on the double-layer ZnO hollow sphere structure and synthesis method thereof.

SUMMARY OF THE INVENTION

It is an object of the present invention to provide a method for synthesizing a double-layer ZnO hollow sphere in one step under mild conditions. In this method, the controllable synthesis of the double-layer ZnO hollow sphere is achieved using the solvothermal process. Moreover, the preparation process is simple, conditions are mild, and no pollution is caused to the environment. The obtained double-layer ZnO hollow sphere has a wide application prospect in the photocatalytic degradation of organic pollutants.

A first aspect of the present invention relates to a double-layer ZnO hollow sphere photocatalytic material. The double-layer ZnO hollow sphere photocatalytic material is formed by inner and outer layers of ZnO hollow spheres, wherein the hollow spheres on the inner layer have a diameter of 1.0-2.5 μm, and the hollow spheres on the outer layer have a diameter of 1.5-4.5 μm.

A second aspect of the present invention relates to a preparation method of a double-layer ZnO hollow sphere photocatalytic material. The method comprises the following steps of: dissolving dissolvable zinc salt into a mixture of monohydric alcohol and ethylene glycol to prepare a solution; then performing a solvothermal reaction on the solution under airtight conditions to prepare the double-layer ZnO hollow sphere photocatalytic material.

Here, the term "solvothermal reaction" is derived from the term "hydrothermal reaction". The hydrothermal reaction refers to the reaction performed on the mother liquor for reaction under airtight conditions and at autogenous pressure produced when it is heated, which uses water as the solvent. When the reaction solvent is changed from water to other solvents, the reaction performed on the mother liquor for reaction under airtight conditions and at autogenous pressure produced when it is heated is referred to as the "solvothermal reaction".

In the present invention, monohydric alcohol is used as a solvent, ethylene glycol is used as a morphology control agent, and the mass of ethylene glycol is 5-15% of that of monohydric alcohol.

Preferably, said dissolvable zinc salt is zinc acetate, zinc nitrate or zinc sulfate, the mass of which is 0.5-2.5% of that of monohydric alcohol.

Preferably, the solvothermal reaction has a temperature range of from 150 DEG C. to 200 DEG C., and the reaction time thereof is in the range of 1-24 h.

Specifically, the preparation method comprises the following steps:

Step 1: A morphology control agent is added into monohydric alcohol (anhydrous ethanol is selected) to prepare a solvent, and the mass ratio between the morphology control agent and the solvent is 5-15%; after stirring is conducted for a certain time, a reaction material zinc acetate ($Zn(CH_3COO)_2 \cdot 2H_2O$), zinc nitrate ($Zn(NO_3)_2 \cdot 6H_2O$) or zinc sulfate ($ZnSO_4$) is dissolved into the above solvent to prepare a solution.

Step 2: The solution prepared in step 1 is transferred into a hydrothermal reactor; after sealing, it is heated in an oven at 150-200 DEG C. for 1-24 h; thereafter, it is cooled down to room temperature.

Step 3: After step 2 is completed, the obtained product is centrifugated, and the product obtained after centrifugation is washed with anhydrous ethanol for several times; then, it is dried at 60 DEG C. for 12 h to obtain the double-layer ZnO hollow sphere.

The present invention has the following advantages:

1. In the present invention, the double-layer ZnO hollow sphere is prepared using a one-step method for the first time. The double-layer hollow structure may augment the specific surface area of the ZnO photocatalytic material, thereby increasing the active sites of photocatalytic reaction. Moreover, it may also increase the number of refraction/reflection of light in the double-layer hollow sphere, thereby improving the utilization efficiency of light. As such, this double-layer ZnO hollow sphere photocatalytic material has good photocatalytic performances in terms of degradation of organic pollutants, which, therefore, can be widely applied to environmental purification.

2. As for the preparation method of the double-layer ZnO hollow sphere prepared in the present invention, it is simple and easy to operate, which dispenses with the tedious step in which templating agents are added first and then subjected to aftertreatment. Moreover, the preparation cost of the product is low, and preparation conditions are mild. Therefore, this preparation method has obvious economic benefits, which is easy to industrialize, and causes no pollution to the environment.

DETAILED DESCRIPTION OF THE INVENTION

The technical solution of the present invention will be further described below in conjunction with the accompanying drawings, but it is not limited thereto. All the modifications or equivalents that are made to the technical solution of the present invention without departing from the spirit and scope defined in the technical solution of the present invention shall be covered by the scope of protection of the present invention.

Example 1

150 ml of an anhydrous ethanol-ethylene glycol (the volume fraction of ethylene glycol is 10%) mixed solution is taken as the solvent, and magnetic stirring is conducted at room temperature for half an hour; thereafter, 1.8 g of zinc acetate is added, and stirring is conducted for half an hour; after zinc acetate is fully dissolved, the solution is transferred into a hydrothermal reactor, and is heated in an oven at a temperature of 180 DEG C. for 12 h; thereafter, the product is centrifugated, and washed with deionized water and anhydrous ethanol for several times; then, it is dried at a temperature of 60 DEG C. for 12 h to obtain the ZnO double-layer hollow sphere.

Example 2

150 ml of an anhydrous ethanol-ethylene glycol (the volume fraction of ethylene glycol is 10%) mixed solution is taken as the solvent, and magnetic stirring is conducted at room temperature for half an hour; thereafter, 1.8 g of zinc nitrate is added, and stirring is conducted for half an hour; after zinc nitrate is fully dissolved, the solution is transferred into a hydrothermal reactor, and is heated in an oven at a temperature of 180 DEG C. for 12 h; thereafter, the product is centrifugated, and washed with deionized water and anhydrous ethanol for several times; then, it is dried at a temperature of 60 DEG C. for 12 h to obtain the double-layer ZnO hollow sphere.

Example 3

150 ml of an anhydrous ethanol-ethylene glycol (the volume fraction of ethylene glycol is 10%) mixed solution is taken as the solvent, and magnetic stirring is conducted at room temperature for half an hour; thereafter, 1.8 g of zinc sulfate is added, and stirring is conducted for half an hour; after zinc sulfate is fully dissolved, the solution is transferred into a hydrothermal reactor, and is heated in an oven at a temperature of 180 DEG C. for 12 h; thereafter, the product is centrifugated, and washed with deionized water and anhydrous ethanol for several times; then, it is dried at a temperature of 60 DEG C. for 12 h to obtain the double-layer ZnO hollow sphere.

Comparative Example

Figure 1:
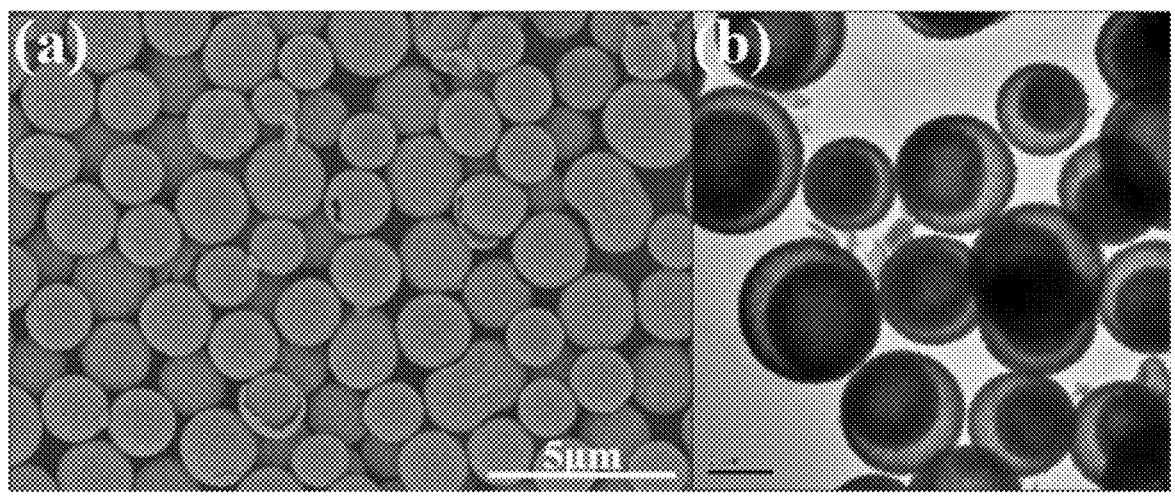
FIG. 1 is a schematic diagram illustrating (a) SEM image and (b) TEM image of a double-layer ZnO hollow sphere prepared in Example 1 of the present invention.

As a Comparative example, 150 ml of absolute anhydrous ethanol is taken as the solvent; 1.8 g of zinc acetate is added, and stirring is conducted for half an hour; after zinc acetate is fully dissolved, the solution is transferred into a hydrothermal reactor, and is heated in an oven at a temperature of 180 DEG C. for 12 h; thereafter, the product is centrifugated, and washed with deionized water and anhydrous ethanol for several times; then, it is dried at a temperature of 60 DEG C. for 12 h to obtain ZnO. FIG. 1 is a schematic diagram illustrating the SEM image of the product obtained in the Comparative example. As can be seen from this figure, the ZnO product obtained under the condition of absolute ethanol has no regular morphology.

Example 4

Figure 2:
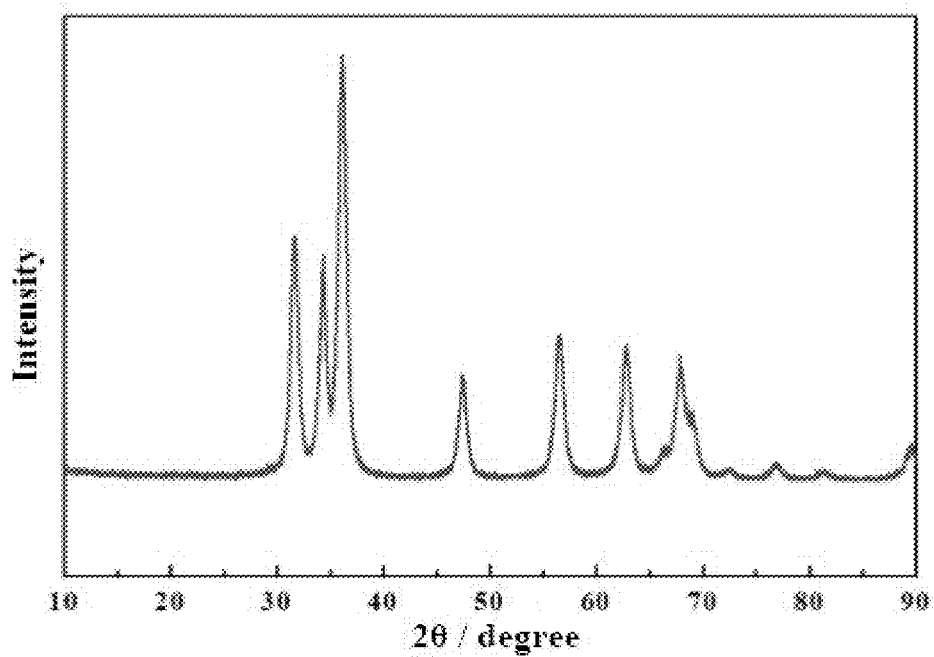
FIG. 2 is a schematic diagram illustrating the XRD spectrum of the double-layer ZnO hollow sphere prepared in Example 1 of the present invention.

In this example, morphology characterization and activity tests are conducted for the products obtained respectively in Example 1 and the Comparative example. Here, product morphologies are observed using SEM and TEM, and product composition and crystalline forms are identified using XRD. FIG. 1 is a schematic diagram illustrating the SEM image and the TEM image of the product obtained in Example 1. As can be seen from this figure, the obtained ZnO is of a double-layer hollow sphere structure. FIG. 2 is a schematic diagram illustrating the XRD spectrum of the double-layer hollow sphere obtained in Example 1. As can be observed from this figure, there is an obvious ZnO diffraction peak.

The testing procedure for photocatalytic performances is as follows: 100 ml of a phenol solution having a concentration of 40 ppm and 20 mg of catalysts are added into a reactor provided with a water-cooling jacket, and ultrasonication is conducted for 30 minutes; thereafter, stirring adsorption is conducted under dark conditions for 20 minutes to reach adsorption equilibrium; then, irradiation is conducted, wherein the light source is a high-pressure xenon lamp placed horizontally above the reactor, and the temperature of the reaction liquid is controlled to be 25 DEG C.; sampling is conducted at set intervals; after centrifugal separation, a supernatant liquid is taken, and the phenol concentrations (expressed in terms of $C/C_0$, wherein C represents a phenol concentration at some point, and $C_0$ represents the initial concentration of phenol) before and after degradation are analyzed using an ultraviolet-visible spectrophotometer so as to calculate the degradation rate of phenol in the solution upon irradiation.

Figure 3:
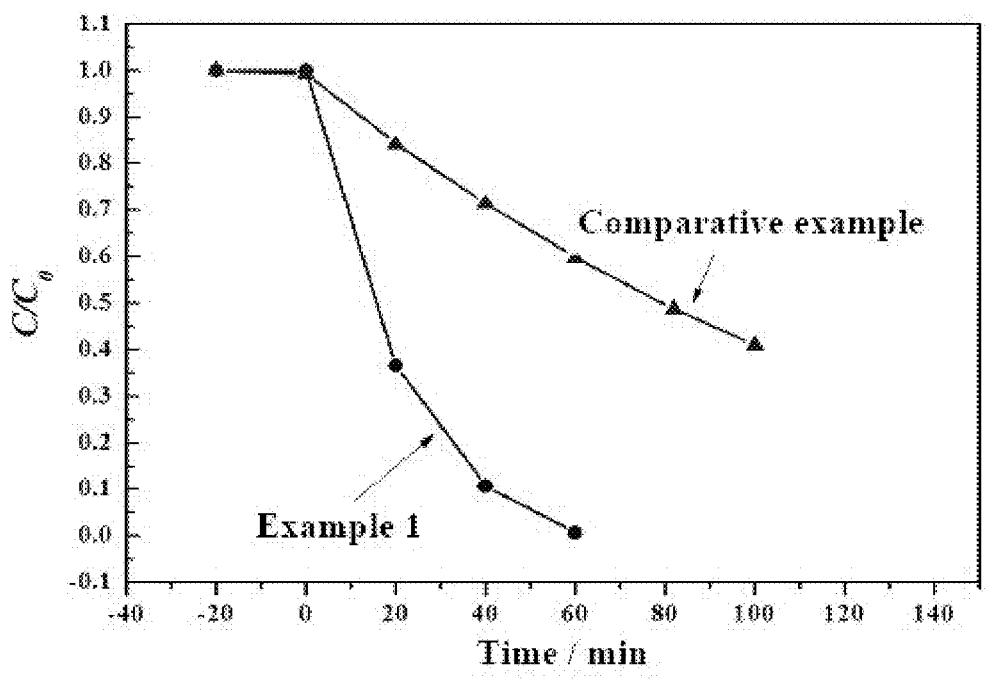
FIG. 3 is a schematic diagram illustrating the effects of ZnO prepared in Example 1 of the present invention and the Comparative example on photocatalytic degradation of phenol.
Figure 4:
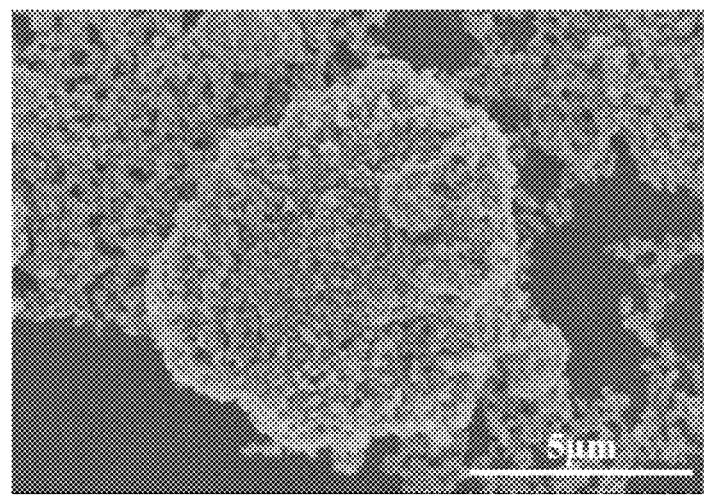
FIG. 4 is a schematic diagram illustrating the SEM image of ZnO prepared in the Comparative example.
Figure 5:
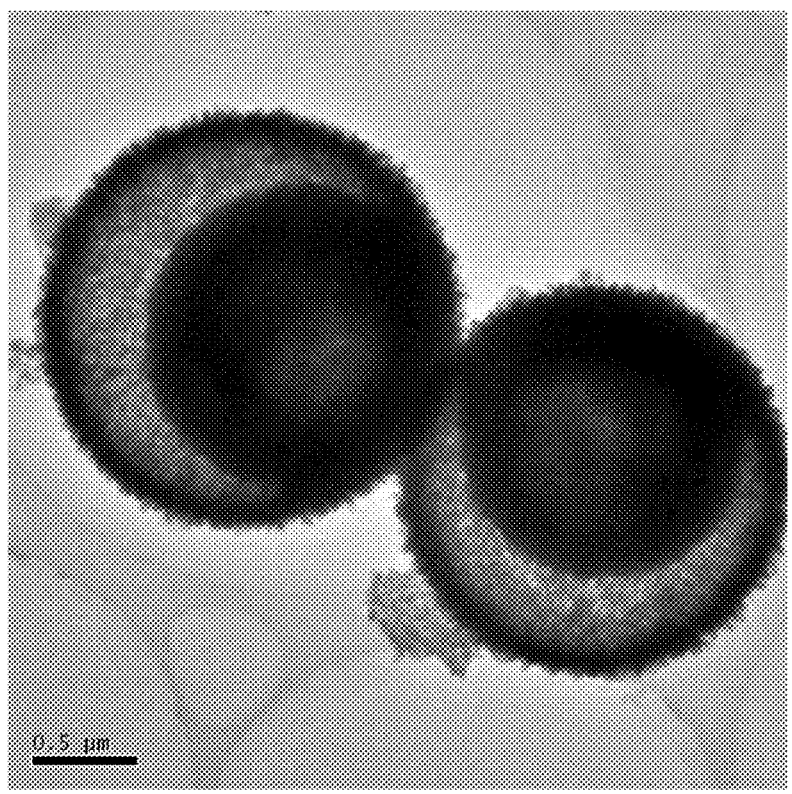
FIG. 5 is a schematic diagram illustrating the high-resolution TEM image of a double-layer ZnO hollow sphere prepared in Example 2 of the present invention.

FIG. 3 is a schematic diagram illustrating the effects of the ZnO double-layer hollow sphere prepared in Example 1 and ZnO prepared in the Comparative example on photocatalytic degradation of phenol. As compared with the Comparative example, the $C/C_0$ achieved by the double-layer ZnO hollow sphere prepared in Example 1 is much lower under the condition that the reaction time is identical, indicating that this double-layer ZnO hollow sphere exhibits superior photocatalytic performances.

The invention claimed is:

1. A preparation method of a double-layer ZnO hollow sphere photocatalytic material, comprising:
   dissolving a dissolvable zinc salt into a mixture of monohydric alcohol and ethylene glycol to prepare a solution, and then performing a solvothermal reaction on the solution under airtight conditions to obtain the double-layer ZnO hollow sphere photocatalytic material.

2. The preparation method of claim 1, wherein monohydric alcohol is used as a solvent, ethylene glycol is used as a morphology control agent, and a mass of ethylene glycol is 5-15% of that of monohydric alcohol.

3. The preparation method of claim 1, wherein the dissolvable zinc salt is zinc acetate, zinc nitrate, or zinc sulfate, and a mass of the dissolvable zinc salt is 0.5-2.5% of that of monohydric alcohol.

4. The preparation method of claim 1, wherein the solvothermal reaction is carried out in a temperature range of from 150° C. to 200° C. for a reaction time in the range of 1 hr to 24 hrs.

* * * * *